May 22, 1923.
F. E. CORWIN
COOKING UTENSIL
Filed Dec. 30, 1921
1,455,780
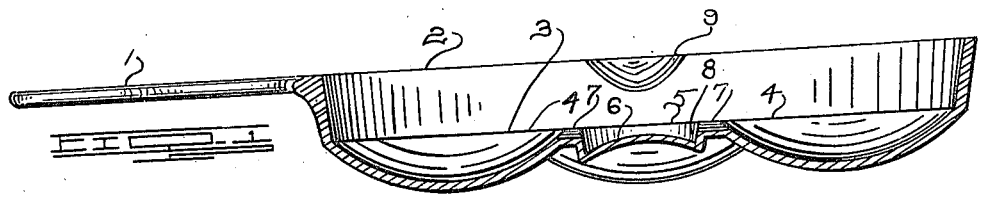
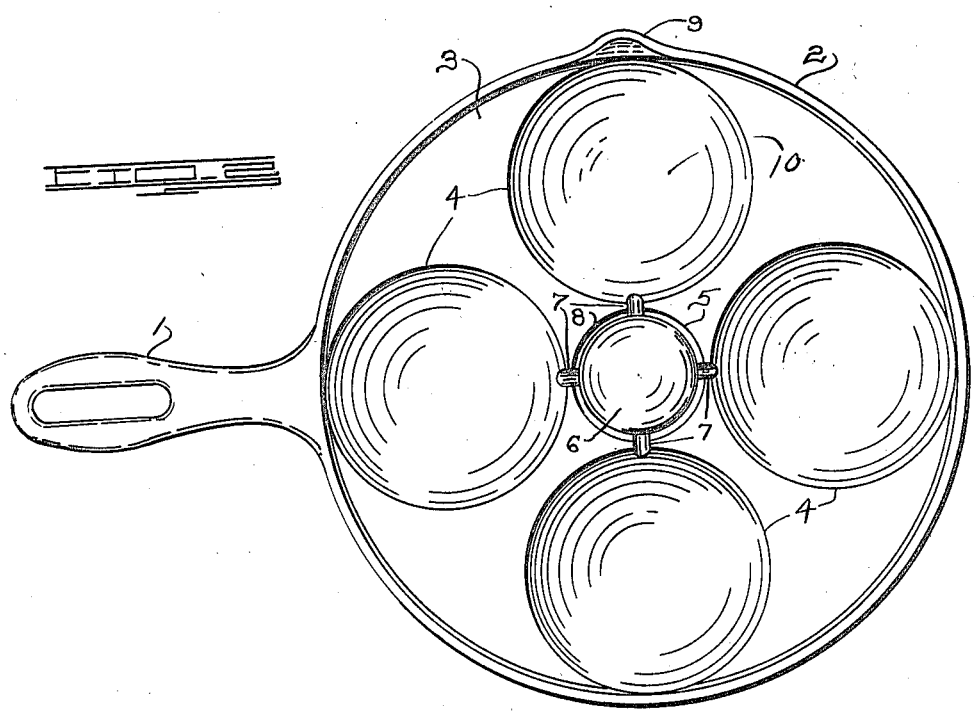
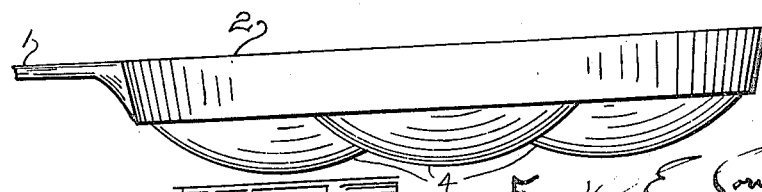
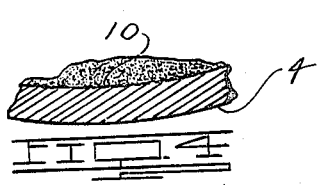
Frank E. Corwin
INVENTOR
BY
Geo E Kirk
ATTORNEY Patented May 22, 1923.

1,455,780

UNITED STATES PATENT OFFICE.

FRANK E. CORWIN, OF TOLEDO, OHIO.

COOKING UTENSIL.

Application filed December 30, 1921. Serial No. 525,845.

*To all whom it may concern:*

Be it known that I, FRANK E. CORWIN, a citizen of the United States of America, residing at Toledo, Lucas County, Ohio, have invented new and useful Cooking Utensils, of which the following is a specification.

This invention relates to cooking utensils.

This invention has utility when incorporated in multi-pocket spiders.

Referring to the drawings:

Fig. 1 is a side elevation showing the vessel portion of the cooking utensil in section;

Fig. 2 is a plan view of the embodiment of the invention as shown in the vessel or cooking utensil of Fig. 1;

Fig. 3 is a side elevation, parts being broken away; and

Fig. 4 is enlarged detail view of a fragment of one of the pocket walls.

Metal handle 1 is shown as extending to endless annular rim or flange 2 surrounding platform 3 as main vessel portion, having therein a plurality of circular major pockets 4 about a central minor pocket 5. This central minor pocket 5 in practice may conveniently serve as a grease or basting oil supply. This central pocket 5 has convex bottom 6. Communicating with each of the major pockets 4 from this minor pocket 5 is a trough 7. This trough 7 is shallow, not only as to the major pockets 4 but as to the major depth 8 of the lubricant supply pocket 5. The flange or rim 2 of the vessel proper as a spider has a pouring spout 9.

In practice it is preferred to have this article as a cooking utensil made of aluminum, the instance being of cast aluminum instead of pressed. Aluminum ware is naturally of a rather soft or lubricant character of surface tending to be smooth in spots, which in instances of cooking surfaces is often very objectionable on account of the adhering properties and lack of permitting due greasing of the surface as against burning of the article to be cooked.

Applicant has found that this objection may be obviated most effectively by giving a matted finish 10 to the cooking surfaces of his cooking utensils herein. A convenient way of effecting this end with the aluminum cast ware is, as by sand blast, to give this article a so-called stone finished surface.

Accordingly when it comes to using this article as a frying pan it may be given the proper grease or oil treatment by having it cooked in and thereafter in the normal use of the metal with the grease or oil supply in the central pocket 5 such will readily boil or sizzle or snap over into the several pockets and keep the pockets not only greased well but effectively baste the articles or material being cooked in the several pockets.

This article has great utility in isolating articles which it is desired to cook simultaneously. Of course, the spider is desirable for eggs, not only for frying, but shirring as well. Furthermore, like cooking treatment may be given croquettes, patties or balls, whether fish, potatoes, meat or composition. Furthermore the utensil may be one which may serve to boil, as for instance boiling eggs. Under these circumstances of course the supply of water should be sufficient to overflow the pockets 4.

What is claimed and it is desired to secure by Letters Patent is:

1. A cooking utensil embodying a plurality of major concave bottom pockets and a minor convex bottom having trough connection with said major pockets.

2. A cooking utensil embodying cooking pockets and an oil supply therefor embodying a convex bottomed pocket.

3. An aluminum cooking utensil of impacted cooking surface of matte finish for holding grease in said surface against material being cooked adhering to said surface.

4. A sand impacted finish aluminum cooking surface cooking utensil whereby material being cooked therein may tend less to adhere.

5. Sanded finish aluminum cooking pockets, a convex base central grease supply pocket shallower than the cooking pockets, and troughs between the supply pocket and cooking pockets of less depth than the pockets.

6. An aluminum cooking vessel provided with a sand blast roughened cooking surface, whereby the soft aluminum skin is impacted to be less porous as to absorbing or conducting away grease and is more effective for retaining grease in the uneven hardened or close grained indentations of such surface for more effectively permitting ready removal of foodstuffs cooked therein.

In witness whereof I affix my signature.

FRANK E. CORWIN.